United States Patent [19]
Ishikawa

[11] Patent Number: 6,005,671
[45] Date of Patent: Dec. 21, 1999

[54] FACSIMILE SYSTEM

[75] Inventor: Seiichi Ishikawa, Kanagawa, Japan

[73] Assignee: Ricoh Company, Ltd., Tokyo, Japan

[21] Appl. No.: 08/994,562

[22] Filed: Dec. 19, 1997

[30] Foreign Application Priority Data

Dec. 20, 1996 [JP] Japan .................................. 8-342234
Dec. 9, 1997 [JP] Japan .................................. 9-339125

[51] Int. Cl.$^6$ .............................. H04N 1/00; H04N 1/32
[52] U.S. Cl. ......................... 358/407; 358/404; 358/468
[58] Field of Search .................................. 358/407, 403, 358/402, 404, 434, 442, 468, 444; 379/100.01, 100.06, 100.08, 100.12; 370/257, 265, 270, 278, 441, 493

[56] References Cited

U.S. PATENT DOCUMENTS

| | | | |
|---|---|---|---|
| 4,855,995 | 8/1989 | Hiyama et al. | 370/86 |
| 5,170,266 | 12/1992 | Marsh et al. | 358/468 |
| 5,265,153 | 11/1993 | Ozawa | 379/100 |
| 5,530,904 | 6/1996 | Koga | 395/872 |
| 5,592,490 | 1/1997 | Barratt et al. | 370/310 |
| 5,682,385 | 10/1997 | Arimilci et al. | 370/468 |

FOREIGN PATENT DOCUMENTS 9-205534 8/1997 Japan .
10-126602 5/1998 Japan .

*Primary Examiner*—Madeleine Nguyen
*Attorney, Agent, or Firm*—Oblon, Spivak, McClelland, Maier & Neustadt, P.C.

[57] ABSTRACT

A facsimile system according to the present invention comprises a job control section, a multiple message transmission object specifying section, a multiple message transmission multiplex access instructing section and a multiple message transmission multiplex access processing section, and the job control section determines whether any transmission file has been specified as an object for multiple message transmission and also a multiplex access instruction has been issued or not, and when a multiplex access instruction has not been issued, the job control section reads out transmission files having been specified as objects for multiple message transmission and continuously transmits the files in succession to the transmission file currently being transmitted, and when the multiplex access instruction has been issued, the job control section reads out transmissions files having been specified as objects for multiple message transmission, by means of multiplex access, and continuously transmits the transmission files.

8 Claims, 9 Drawing Sheets

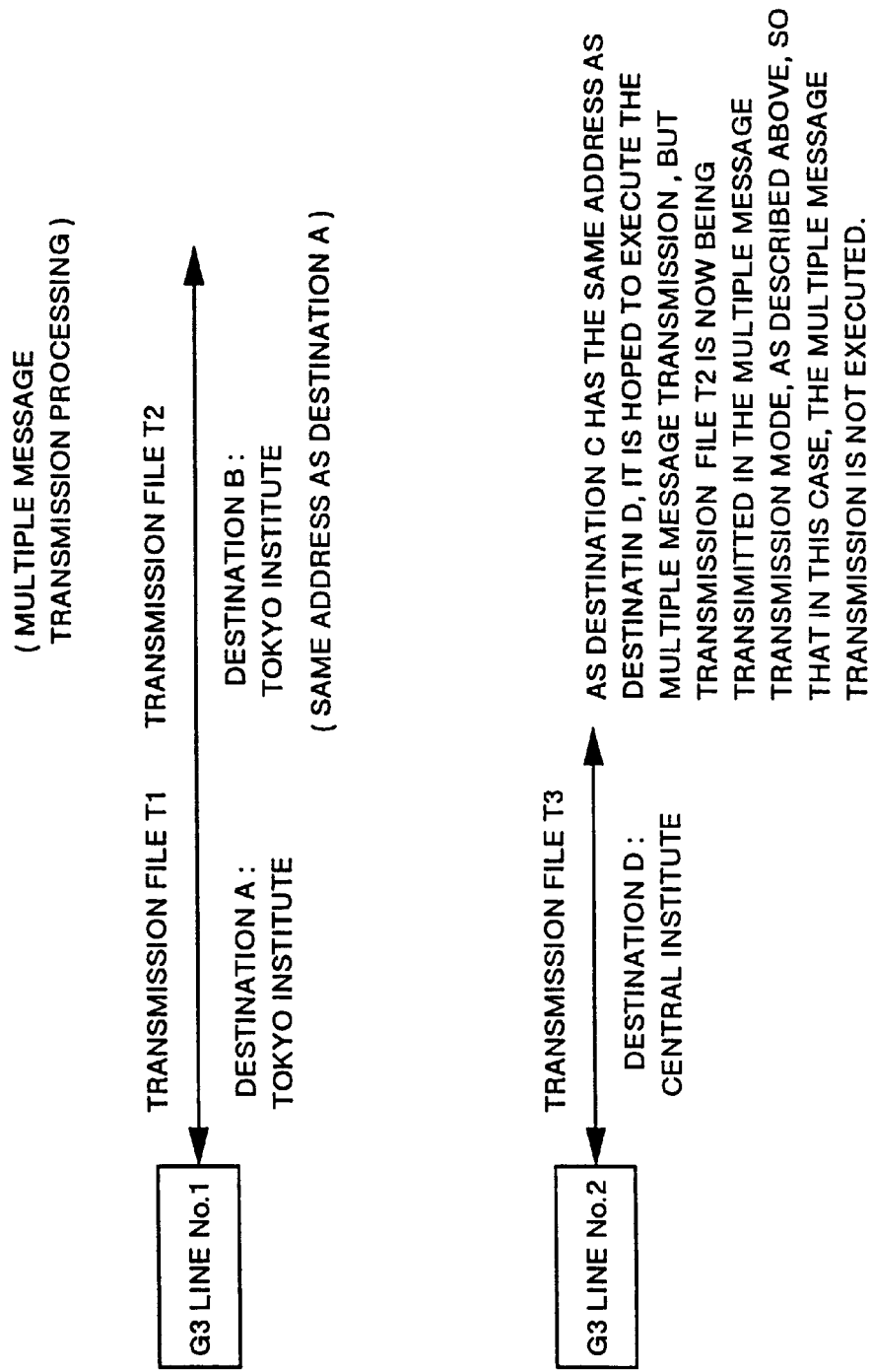

FACSIMILE SYSTEM

FIELD OF THE INVENTION

The present invention relates to a facsimile system having a function for multiple message transmission processing for continuously transmitting a file or files each having the same destination for transmission as that of a file currently being transmitted in succession to the file currently being transmitted, and more specifically to a facsimile system which can treat one transmission file as an object for a plurality of types of multiple message transmission processing when simultaneously executing the multiple message transmission processing via a plurality of communication lines.

BACKGROUND OF THE INVENTION

As a facsimile system based on the conventional technology, there is a facsimile system which has the multiple message transmission processing function for continuously transmitting a file or files having the same destination for transmission as that of a file currently being transmitted in succession to the file currently being transmitted. In this type of facsimile system a file for each job processing unit called a job file is allocated to one transmission file, and a destination for transmission specified by a user is managed as a destination file corresponding to the transmission file, and access thereto can be made from the job file described above.

Herein description is made for the multiple message transmission processing in the conventional type of facsimile system with reference to FIG. 8 as well as to FIG. 9. It is assumed herein that the facsimile system has two G3 lines, namely G3 line No. 1 and G3 line No. 2, and also that three transmission files, namely transmission files T1 to T3 are accumulated in a specified memory.

Also it is assumed herein that, as shown in FIG. 8, "Destination A; Tokyo Institute" has been specified as a destination for transmission to the transmission file T1, "destination B: Tokyo Institute" and "Destination C: Central Institute" as destinations for transmissions to the transmission file T2, and "Destination D: Central Institute" as a destination for transmission to the transmission file T3.

As shown in FIG. 9, for instance, when the transmission file is being transmitted in the mode of memory transmission through the G3 line No. 1 to "Destination A; Tokyo Institute", as the "destination B: Tokyo Institute" has the same address as "Destination A: Tokyo Institute", the transmission file T2 becomes an object for the multiple message transmission processing, and the transmission T2 is continuously transmitted in succession to the transmission file T1.

At the same time, if the transmission file T3 is being transmitted in the mode of memory transmission through the G3 line No. 2 to the "Destination D: Central Institute", as the "Destination C: Central Institute" has the same address as that of the "Destination D: Central Institute", it is hoped to regard the transmission file T2 as an object for the multiple message transmission processing and to continuously transmit the transmission file T2 in succession to the transmission file T3. However, as the transmission file T2 is now being transmitted in the multiple message transmission mode (or has been specified as an object for the multiple message transmission processing), so that in this case the transmission file T2 can not duplicatedly be treated as an object for the multiple message transmission processing, and the multiple message transmission processing is not executed.

For this reason, the transmission file T2 is transmitted anew when either one of the G3 line No. 1 or G3 line No. 2 becomes available.

As described above, with the conventional technology, when transmission is simultaneously executed through a plurality of communication lines, even in a case where one transmission file (the transmission file T2 in the above case) becomes an object for transmission in each communication line, if the transmission file has been treated as an object for transmission through a different communication line, the transmission file can not be treated as an object for transmission through the communication line, and it is required to wait until any other communication line becomes available and then to call the destination for transmission again for execution of transmission, so that the multiple message transmission processing function can not fully be used, and also there has been problems concerning effective use of communication lines, reduction of communication cost, and efficient utilization of the facsimile system.

SUMMARY OF THE INVENTION

It is an object of the present invention to make full use of the multiple message transmission processing function, effectively use communications lines, reduce the communication costs, and efficiently use the facsimile apparatus by treating one transmission file as an object for a plurality types of multiple message transmission processing when the multiple message transmission processing is simultaneously executed through a plurality of communication lines.

The facsimile system according to the present invention comprises a multiple message transmission object specifying unit for comparing a destination for transmission of a transmission file being transmitted by the memory transmission control unit to a destination for transmission of each of other transmission files and specifying, when there are any transmission files each having the same destination for transmission, the transmission files having the same destination for transmission as objects for multiple message transmission; a multiplex access instructing unit for issuing, when any of the transmission files as objects for multiple message transmission specified by the multiple message transmission object specifying unit has been specified as an object for multiple message transmission of other transmission files having a different destination for transmission, a multiplex access instruction to the memory transmission control unit for executing multiplex access to the transmission file as an object for multiple message transmission; and a multiplex access processing unit for executing a multiplex access to transmission files accumulated in the memory unit; wherein the memory transmission control unit determines whether or not transmission files have been specified as objects for multiple message transmission specified by the multiple message transmission object specifying unit and also a multiplex access instruction has been issued to the transmission files as objects for multiple message transmission, reads out the transmission files as objects for multiple message transmission from the memory unit in succession to the transmission files currently being transmitted and continuously transmits the read-out transmission files when the multiplex access instruction has not been issued, and reads out the transmission files as objects for multiple message transmission via the multiplex access processing unit from the memory unit and continuously transmits the read-out transmission files in succession to the transmission files currently being transmitted when the multiplex access instruction has been issued; and for this reason when the multiple message transmission processing is executed simultaneously for a plurality of communication lines, by processing one transmission file as an object for multiple message transmission for other transmission files, it becomes possible to effectively use the multiple message transmission processing function, which in turn enables effective use of communication lines, reduction of communication cost, and efficient use of a facsimile system.

Other objects and features of this invention will become understood from the following description with reference to the accompanying drawings.

BRIEF DESCRIPTION OF THE DRAWINGS

FIG. 9 is an explanatory view showing the multiple message transmission processing in a facsimile system based on the conventional technology.

DETAILED DESCRIPTION OF THE EMBODIMENTS

Next detailed description is made for one embodiment of the facsimile system according to the present invention with reference to the related drawings.

Figure 1:
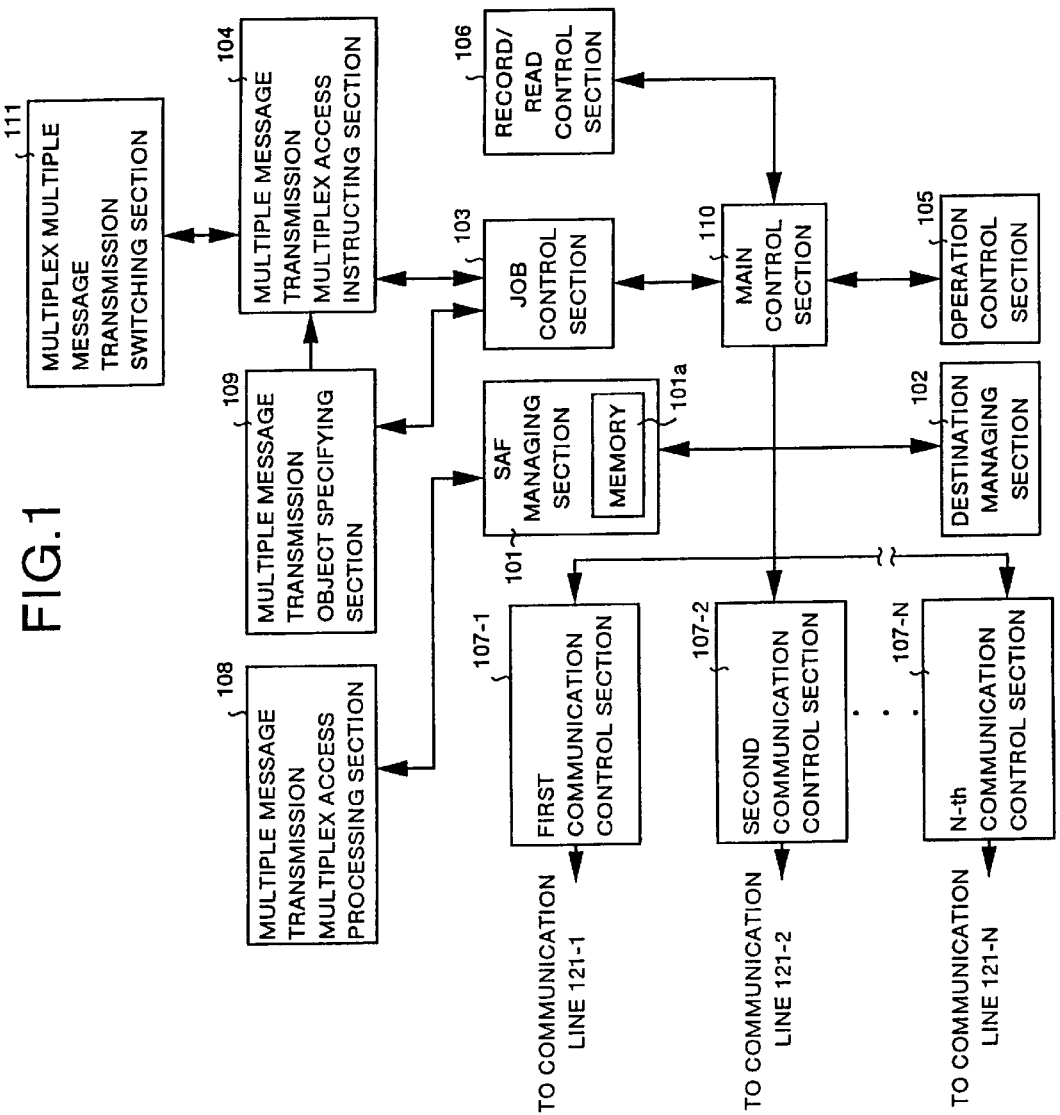
FIG. 1 is a block diagram showing a control system for a facsimile system according to this embodiment.

FIG. 1 is a block diagram showing a control system for the facsimile system according to the present invention, and the control system comprises an image information managing section 101 (described as SAF managing section hereinafter) for managing a memory 101*a* for storing therein transmission files (image information data) to be transmitted through the facsimile system and received files (image information data) received through the facsimile system; a destination managing section 102 for managing a telephone number of a destination for transmission, telephone numbers of destinations for transmission in the broadcasting mode, and attribute information for the destinations for transmission; a job control section 103 for controlling each job in transmitting or receiving a file through the facsimile system; a multiple message transmission multiplex access instructing section 104 as a multiplex access instructing unit for issuing a multiplex access instruction to the job control section 103 so that multiplex access is executed to transmission files as objects for multiple message transmission described hereinafter; an operation control section 105 for providing controls over an operation panel (not shown) for executing various operations of the facsimile system; a record/read control section for controlling an operation for reading a document as well as an operation for recording the received document; a plurality of communication control sections 107 (1st to N-th communication control sections 107-1 to 107-N) each corresponding to one communication line (not shown) and comprising a device in turn including a modulation/demodulation circuit (modem) or the like for modulating/demodulating data transmitted or received through a facsimile system and also providing controls for communications; a multiple message transmission multiplex access processing section 108 as a multiplex access processing unit for executing multiplex access to transmission files accumulated in the memory 101*a* of the SAF managing section 101; a multiple message transmission object specifying section 109 for specifying transmission files as objects for multiple message transmission processing; a main control section 110 for unifiedly controlling each of the sections described above; and multiplex multiple message transmission switching section 111 as a specifying unit for specifying whether an multiplex access instruction is to be issued from the multiple message transmission multiplex access instruction section 104.

It should be noted that the 1st to N-th communication control sections 107-1 to 107-N are connected to the 1st to N-th communication lines 121-1 to 121-N respectively.

The job control section 103 provides controls for starting transmission of a transmission file as a document for transmission accumulated in the memory 101*a* managed by the SAF managing section 101, for a sequence of transmission and receiving or the like when a plurality of transmission files (transmission jobs) are present, and for receiving jobs such as starting a receiving operation when a transmission file arrives, preparation of a receiving job (a received file), and an operation for starting printing data in the received file onto recording paper. Further the job control section 103 stores therein data concerning transmission files or received files relating to each job, or data on telephone numbers of destination for transmission. Also, the job control section 103 plays a role of the memory transmission controlling unit according to the present invention.

The multiple message transmission object specifying section 109 plays a role as the multiple message transmission object specifying unit according to the present invention, compares destinations of transmission of the transmission files currently being transmitted under controls by the job control section 103 to destinations for transmission of other transmission files under controls by the SAF managing section 101, and specifies transmission files having the same destination for transmission, when there are transmission files having the same destination for transmission, as objects for multiple message transmission processing.

The destination managing section 102 plays a role as a telephone number registering unit for registering and storing therein telephone numbers and attribute information for each destination for transmission, and the attribute information includes at least telephone numbers for the class 1 communication line (G3 line) and class 2 communication line (G4 line), availability of modem function based on particular specifications, and availability of a contracted procedure for the class 1 or class 2 communication line according to a particular protocol.

Herein the information concerning availability of modem function based on particular specifications is information as to whether a receiving terminal has the V.34 function based on the new recommendation by ITU-T or not. It should be noted that, in the protocol V.34 based on the new recommendation by ITU-T, maximum speed communication (at max. 33.6 [Kbps]) can be made as a G3 facsimile machine).

Information concerning the availability of a contracted procedure according to a particular protocol for the class 1 or class 2 communication line is information as to whether the receiving terminal supports the contracted procedure based on a unique protocol or not. In this embodiment, as a contracted procedure based on a unique G3 protocol specific to facsimile system manufactured by Ricoh Co., Ltd., there is, for instance, the one called AI contracted protocol. In this contracted protocol, a procedure in phase B in the G3 protocol is contracted.

With the configuration as described above, now description is made for operations in the order of 1) a case where the multiplex multiple message transmission processing is specified, 2) a case where the multiplex multiple message transmission processing is not specified, 3) processing for deleting transmission files as objects for multiple message transmission, and 4) processing for selection of an appropriate line according to the attribute information. It should be noted that the multiplex multiple message transmission processing is defined herein as processing for specifying the same transmission file as an object for multiplex multiple message transmission and executing the multiple message transmission processing means of multiplex access.

1) A Case Where the Multiplex Multiple Message Transmission Processing is Specified At first, a user operates the multiplex multiple message transmission switching section 111 so that a multiplex access instruction is issued from a multiple message transmission multiplex access instructing section 104.

Then, the user sets a document to be transmitted on a facsimile system, and gives an instruction for memory transmission via the operation panel, when contents of the operating instruction is reported through the operation control section 105 to the main control section 110. When the main control section 110 issues an instruction for reading the document to be transmitted to the record/read control section 106, the document to be transmitted is read under controls by the record/read control section 106, and image information data of the document to be transmitted is stored as a transmission file in the memory 101a under controls by the SAF managing section 101.

On the other hand, the job control section 103 prepares one transmission job (a job corresponding to the stored transmission file) simultaneously when the transmission file is stored, and maintains the transmission job. It should be noted that, simultaneously when this transmission job is prepared, information concerning a destination for transmission in the memory transmission mode registered in the destination managing section 102 is sent from the operation control section 105, the destination managing section 102 correlates the prepared transmission job (namely the transmission file) and the information concerning the destination (namely the destination for transmission), and also correlates it to a telephone number and attribute information registered in correlation for each destination for transmission, and stores therein the correlated data.

Figure 8:
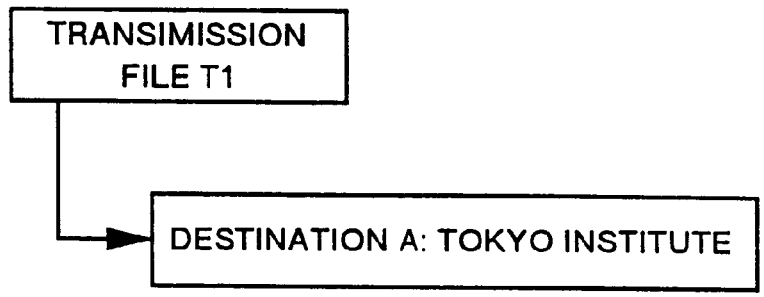
FIG. 8 is an explanatory view showing the multiple message transmission processing in a facsimile system based on the conventional technology.
Figure 8:
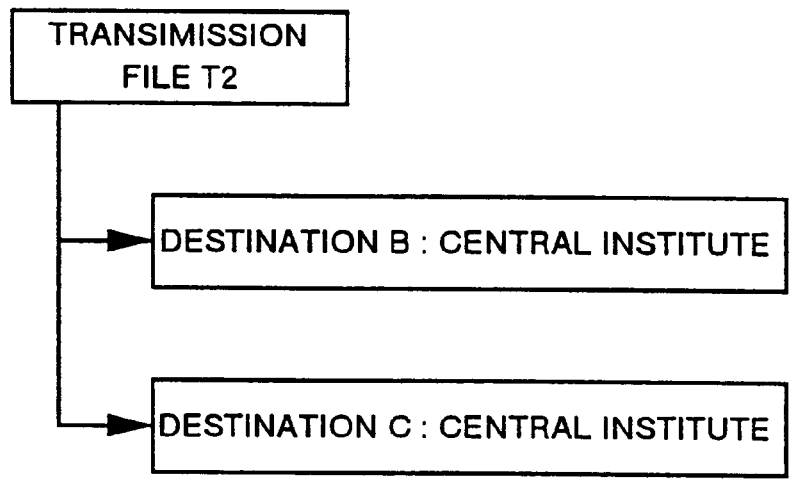
Figure 8:
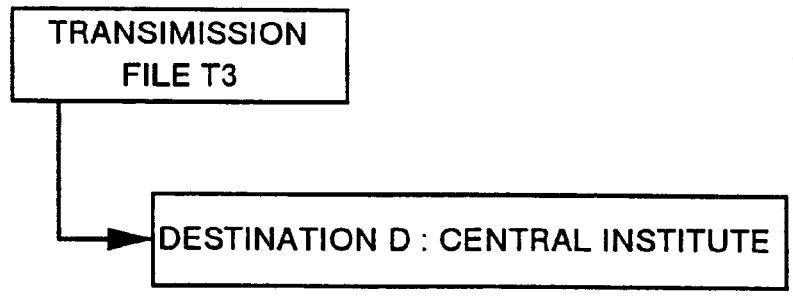

Further, when the user executes the same operation and a new transmission file is stored in the memory 101a, a new transmission job is prepared. As described above, it is assumed herein that, for instance, as shown in FIG. 8, three transmission files; namely the transmission files T1 to T3 have been accumulated in the memory 101a.

Then the job control section 103 finds out an available communication line from a plurality of communication control sections 107, and starts transmission of the transmission file. At the same time, the multiple message object specifying section 109 compares a destination for transmission of the transmission file currently being transmitted to each destination for transmission of other transmission files, and if there are a transmission file or transmission files having the same destination for transmission, the multiple message transmission object specifying section 109 specifies the transmission file or files as objects for the multiple message transmission processing.

Figure 3:
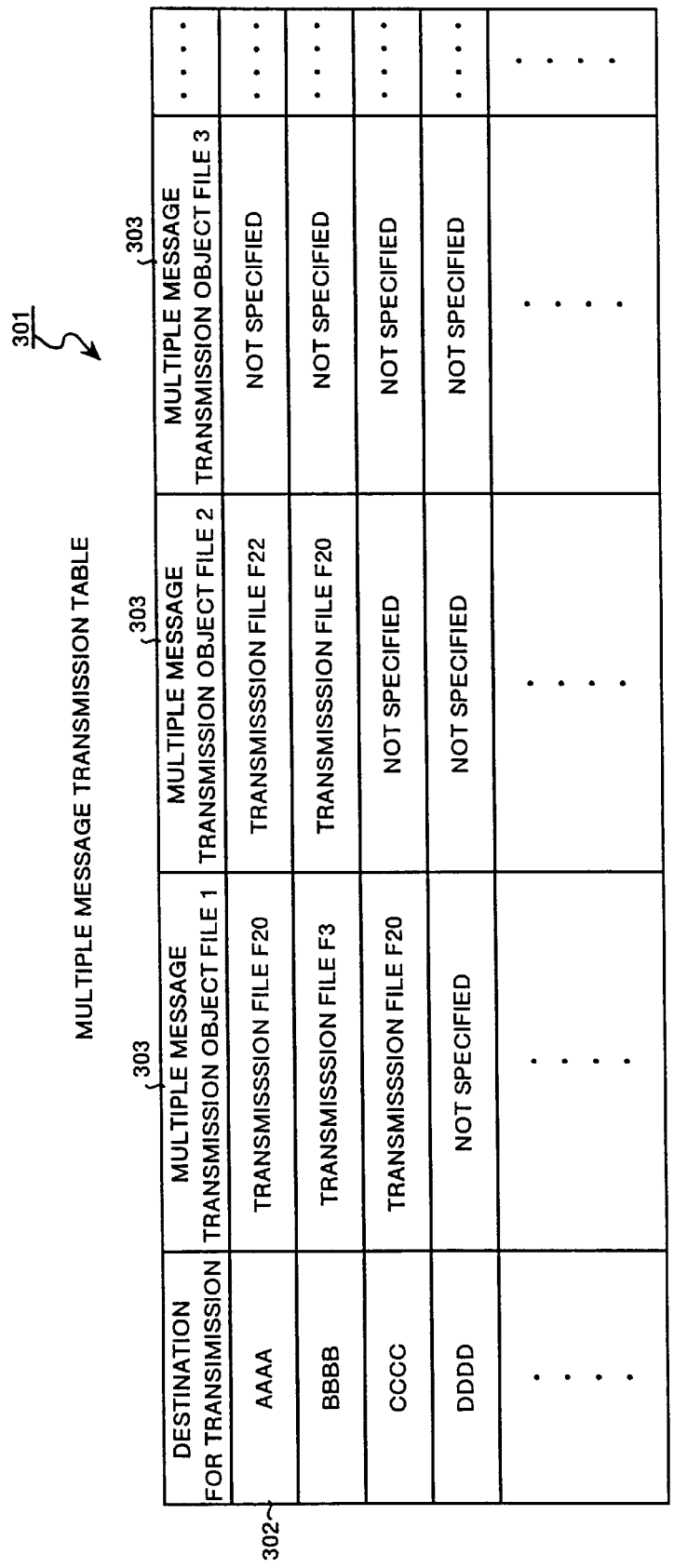
FIG. 3 is an explanatory view showing as example of a multiple message transmission table according to the present embodiment.

More specifically, as shown in FIG. 3, if there is any transmission file having the same destination for transmission, the transmission file having the same destination for transmission is registered, using a multiple message transmission table 301 in which a destination for transmission 302 of the transmission file currently being transmitted is correlated to a plurality of multiple message transmission object file select columns 303, in the multiple message transmission object file select columns 303 for the destination for transmission 302 in the multiple message transmission table 301 to specify it as an object for the multiple message transmission.

Herein the number of destinations for transmission 302 is coincident to the number of lines connected to the facsimile system. Also, transmission files as objects for multiple message transmission to be transmitted in succession to the transmission file currently being transmitted are registered in the multiple message transmission object file select columns 303 according to a prespecified order.

The job control section 103 starts transmission of the transmission file using another available communication line. Also in this step, the multiple message transmission object specifying section 109 compares a destination for transmission of the transmission file currently being transmitted to each destination of other transmission files, and if there is any transmission file having the same destination for transmission, the multiple message transmission object specifying section 109 specifies the transmission file having the same destination for transmission as an object for the multiple message transmission processing.

On the other hand, if any transmission file has been specified as an object for multiple message transmission by the multiple message transmission object specifying section 109, the multiple message transmission multiplex access instructing section 104 refers to the multiple message transmission table 301 (Refer to FIG. 3) to determine whether the transmission file has been already specified as an object for multiple message transmission or not, and if it is determined that the transmission file has been specified as an object for another multiple message transmission, the multiple message transmission multiplex access instructing section 104 outputs a multiplex access instruction to the job control section 103 to make multiplex access to the transmission file as an object for the multiple message transmission.

According to a result of determination as to whether or not a multiplex access instruction has been issued to the transmission file as an object for multiple message transmission specified by the multiple message transmission object specifying section 109 as well as to the transmission files as objects for the current multiple message transmission, the job control section 103 reads out the transmission files as objects for multiple message transmission from the memory 101a and continuously transmits the transmission files in succession to the transmission files currently being transmitted, when a multiplex access instruction has not been issued.

On the other hand, when a multiplex access instruction has been issued, the job control section 103 gives a notice of the multiplex access instruction to the SAF managing section 101 as well as to the multiple message transmission multiplex access processing section 108 to have the multiplex access processing executed in the multiple message transmission multiplex access processing section 108 in succession to the transmission file currently being transmitted, and then the transmission files as objects for multiple message transmission are read out from the memory 101a and are transmitted in succession.

Figure 2:
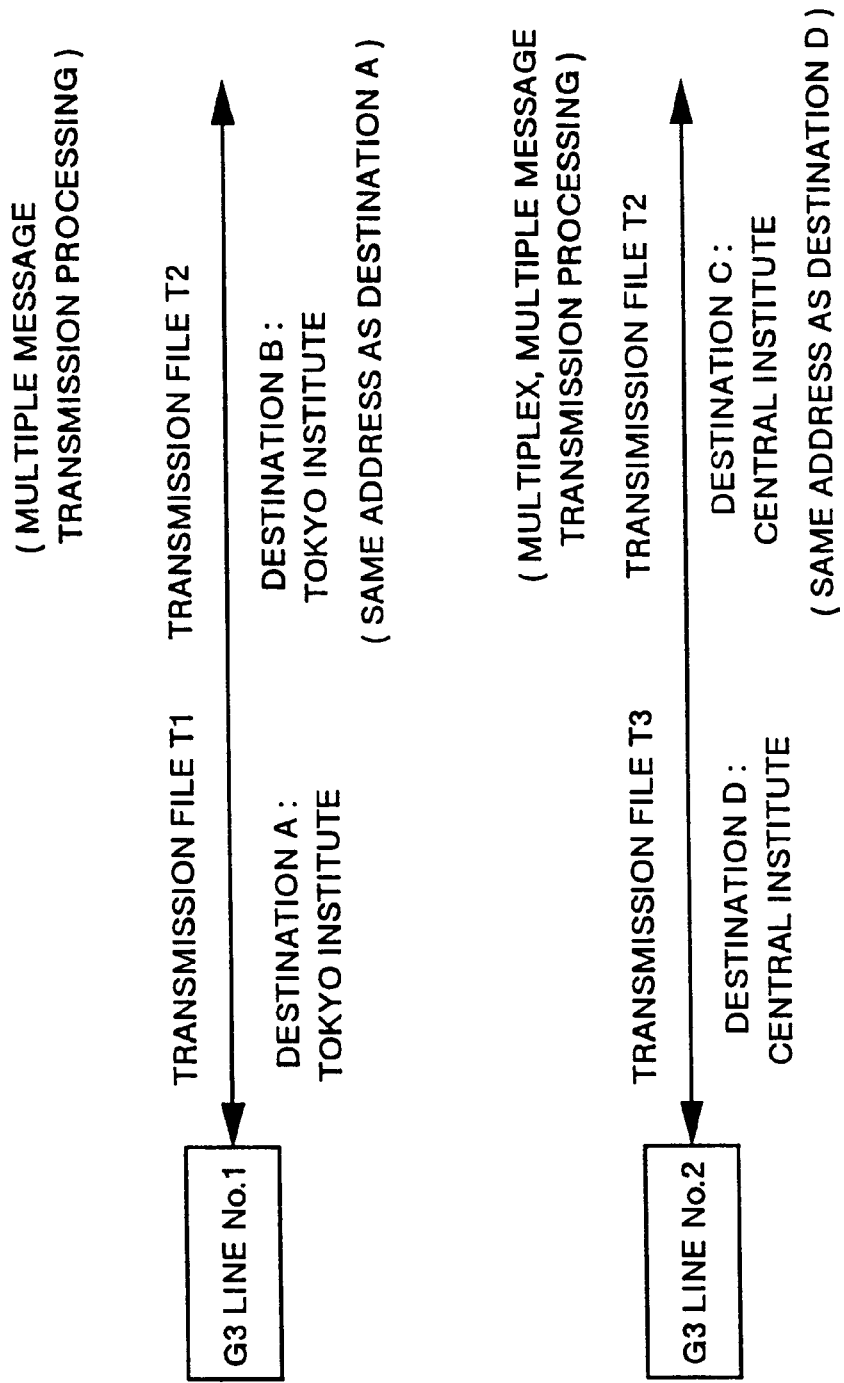
FIG. 2 is an explanatory view illustrating the multiple message transmission processing according to the present invention.

More specifically, as shown in FIG. 2, when a transmission file T1 is being transmitted in the memory transmission mode through a G3 line No. 1 to the "Destination A: Tokyo Institute", as the "Destination B: Tokyo Institute" has the same destination as the "Destination A: Tokyo Institute", a transmission file T2 becomes an object for multiple message transmission processing, and is specified as an object for multiple message transmission by the multiple message transmission object specifying section 109. At this point of time, as the transmission file T2 has not been specified as an object for multiple message transmission of any other file, a multiplex access instruction is not outputted from the multiple message transmission multiplex access instructing section 104. For this reason, the job control section 103 continuously transmits the transmission file T2 as an object for multiple message transmission in succession to the transmission file T1.

Then, when the transmission file T2 is specified as an object for multiple message transmission of the transmission file T1 currently being transmitted through the G3 line No. 1 and then transmission of a transmission file T3 to the "Destination D: Central Institute" is started through the G3 line No. 2 in the memory transmission mode, as the "Destination C: Central Institute" has the same destination as the "Destination D: Central Institute", the transmission file T2 becomes an object for the multiple message transmission processing, and is specified as an object for multiple message transmission by the multiple message transmission object specifying section 109. At this point of time, as the transmission file T2 has been specified as an object for multiple message transmission for the transmission file T1, a multiplex access instruction is issued from the multiple message transmission multiplex access instructing section 104.

As a multiplex access instruction has been outputted to the transmission file T2 having been specified as an object for multiple message transmission, the job control section 103 gives a notice of the multiplex access instruction to the SAF managing section 101 as well as to the multiple message transmission multiplex access processing section 108, and makes the multiple message transmission multiplex access processing section 108 execute the multiplex access processing to continuously read and transmit the transmission file T2 from the memory 101a in succession to the transmission file T3 currently being transmitted by means of multiplex access. In other words, the transmission file T2 is read out and subjected to the multiple message transmission processing by means of multiplex access, so that the multiplex multiple message transmission processing, in which the same transmission file T2 is specified as an object for multiple message transmission of a plurality of transmission files (T1 and T3), is executed.

2) A Case Where the Multiplex Multiple Message Transmission Processing is not Specified When the multiplex multiple message transmission processing is not specified, the user operates the multiplex multiple message transmission switching section 111 so that a multiplex access instruction is not outputted from the multiple message transmission multiplex access instructing section 104. With this operation, the multiple message transmission multiplex access instructing section 104 does not output a multiplex access instruction, so that the job control section 103 always determines that a multiplex access instruction is not outputted and does not give a notice of any multiplex access instruction to the SAF managing section 101, nor to the multiple message transmission multiplex access processing section 108. For this reason, operations in this case are the same as those in the conventional type of multiple message transmission processing as described in relation to FIG. 9. In other words, as the transmission file T2 has already been in operation for being transmitted (specified as an object for multiple message transmission for other transmission file), so that the transmission file T2 cannot be specified as an object for multiple message transmission in this case and the multiple message transmission processing is not executed. Accordingly, transmission of the transmission file T2 to the "Destination C: Central Institute" is executed anew when any of the G3 line No. 1 and G3 line No. 2 becomes available.

As described above, with the present embodiment, one transmission file can be specified as an object for multiple message transmission for a plurality of transmission files and multiplex multiple message transmission processing can be executed by means of multiplex access, so that, when the multiple message transmission processing is simultaneously executed through a plurality of communication lines, it is possible to fully use the multiple message transmission processing function by processing one transmission file as an object for multiple message transmission processing for a plurality of transmission files, which allows effective use of communication lines, reduction of communication cost, and efficient utilization of a facsimile system.

It should be noted that, although the above description assumed, to simplify the description, a case where a transmission file is specified as an object for the multiple message transmission processing by the multiple message transmission object specifying section 109, and this specification may be executed by the job control section 103.

3) Processing for Deleting a Transmission File as an Object for Multiple Message Transmission Next description is made for the processing for a transmission file having been specified as an object for multiple message transmission. In this embodiment, it is possible to delete an arbitrary transmission file among transmission files accumulated in the memory 101a of the SAF managing section 101 via the operation panel (not shown) as well as the operation control section 105.

For instance, when a user selects the processing for deleting a transmission file through the operation panel, the operation control section 105 displays a list of transmission files accumulated in the SAF managing section 101 on a display section of the operation panel. When a user selects and specifies a desired transmission file from the list displayed on the display section, the operation control section 105 instructs deletion of the transmission file to the SAF managing section 101, and the SAF managing section 101 deletes the transmission file from the transmission files accumulated in the memory 101a. Also, when the operation control section 105 reports deletion of the transmission file via the main control section 110 to the job control section 103, the job control section 103 executes the processing for stopping a corresponding transmission job.

At this point of time, the job control section 103 reports a stop of the transmission job to the multiple message transmission object specifying section 109. The multiple message transmission object specifying section 109 refers to the multiple message transmission table 301 shown in FIG. 3, and deletes, when the deleted transmission file has been specified as an object for multiple message transmission, the transmission file from the multiple message transmission object file select columns 302 in the multiple message transmission table 301, and releases the multiple message transmission processing. Accordingly, even after the multiple message transmission processing is specified, a transmission file having been specified as an object for multiple message transmission can be deleted, which enables improvement in convenience and operability.

4) Processing for Selecting an Appropriate Line According to Attribute Information Next, description is made for the processing for selecting an appropriate line according to attribute information. It should be noted that the following description assumes a case of broadcasting transmission processing to simplify the description, but the operating mode is not always limited to the broadcasting transmission processing, and the function for selecting an appropriate line can be used also when transmission of a plurality of transmission files is started simultaneously.

Figure 4A:
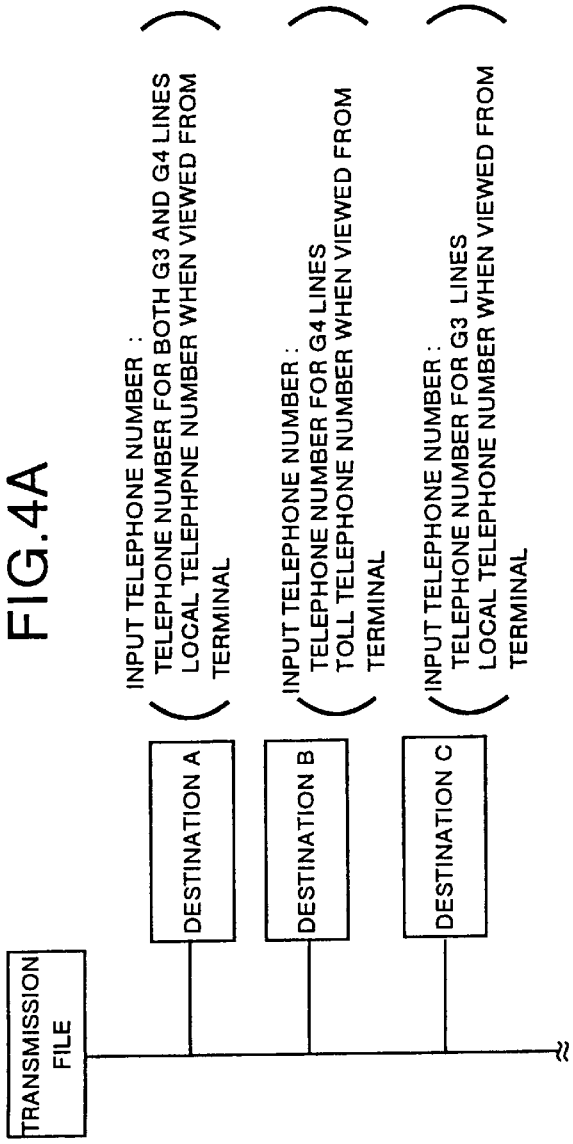
FIGS. 4A and 4B are explanatory views showing, as an example, a case where types of lines to be supported and telephone numbers for each line type are stored as attribute information for each destination for transmission.
Figure 4B:
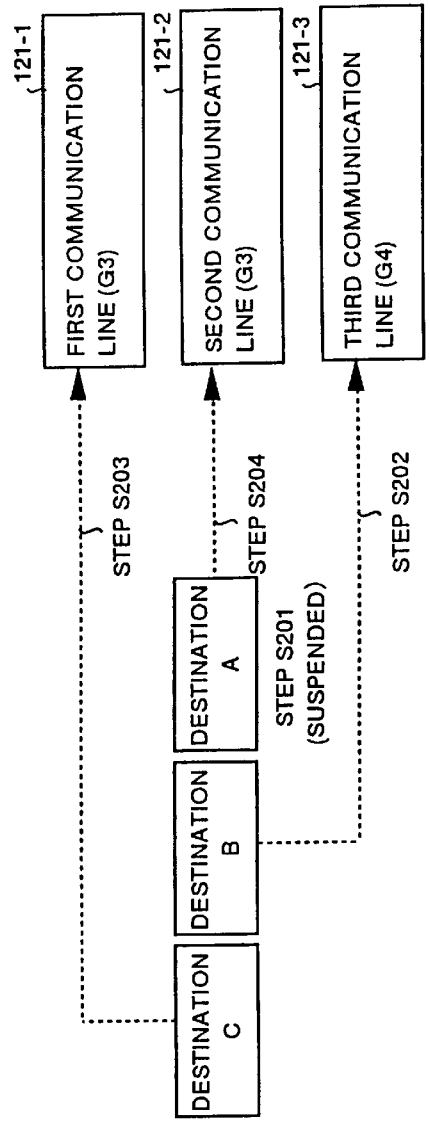

At first, FIGS. 4A and 4B show a case where types of supported lines and telephone numbers for each line type are ready as attribute information for each destination for transmission. Namely, FIGS. 4A and 4B show a case where a plurality of destinations for transmission such as destination A, destination B, destination C . . . have been specified for a transmission file, and three communication lines; a first communication line 121-1 and a second communication line 121-2, each of which is a G3 line, and a third communication line 121-3, which is a G4 line, are available.

Herein it is assumed that types of supported lines and telephone numbers for each line type are ready as attribute information for each destination for transmission. Namely, as for Destination A, telephone numbers for both the G3 and G4 lines are inputted, and the telephone numbers are local telephone numbers when viewed from the terminal, and for Destination B, a telephone number for the G4 line, which is a toll telephone number when viewed from the terminal, is inputted, and also for Destination C, a telephone number for the G3 line, which is a local telephone number when viewed from the terminal, is inputted.

In the case as described above, as shown in FIG. 4B, at first, in step S201, allocation of a communication line to Destination A is examined in this embodiment, but as a call to Destination A is a local call, the call is suspended and processed later.

Then in the next step S202, allocation of a communication line to Destination B is examined, but as a call to Destination B is a toll call, and also as the G4 line has been specified, the third communication line (G4) 121-3 is allocated to Destination B.

Then in step S203, allocation to a communication line to Destination C is examined, but as the G3 line has been specified for Destination C, the first communication line (G3) 121-1 is used.

Further, in step S204, allocation of a communication line to Destination A is examined again, but as also a telephone number to the G3 line has been inputted for Destination A, transmission is executed by using the second communication line (G3) 121-2.

In the broadcasting transmission processing based on the conventional technology, as available lines are allocated according to a prespecified order, the third communication line 121-3, which is a G4 line, is allocated to Destination A, and the transmission processing to Destination B can not be executed before the transmission processing to Destination A is finished, but in this embodiment, when it is determined that a call for Destination B is a toll call, use of the G4 line is preferentially promoted, and transmission is executed to Destination A through the G3 line, so that it is possible to generally improve efficiency in use of line in transmission of transmission files in the broadcasting transmission mode and also to reduce a line fee. Especially, if the multiple message transmission processing is executed in addition to this broadcasting transmission processing, the effect can become more remarkable.

Figure 5A:
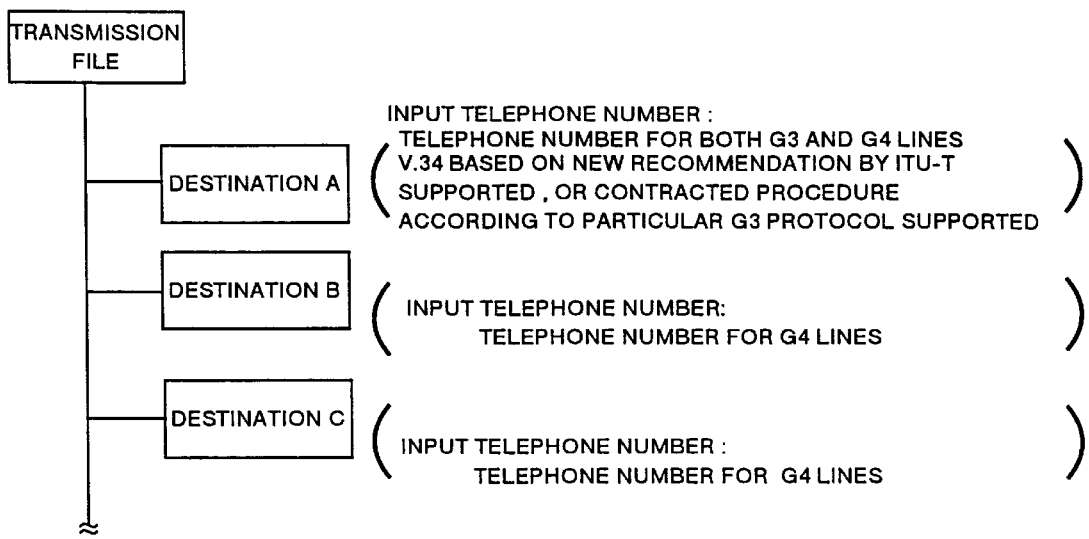
FIGS. 5A and 5B are explanatory views showing, as an example, a case where data on types of lines to be supported, telephone numbers for each line type, availability of a specific modem functions and availability of contracted sequence function according to a particular protocol are available as attribute information for each destination for transmission.
Figure 5B:
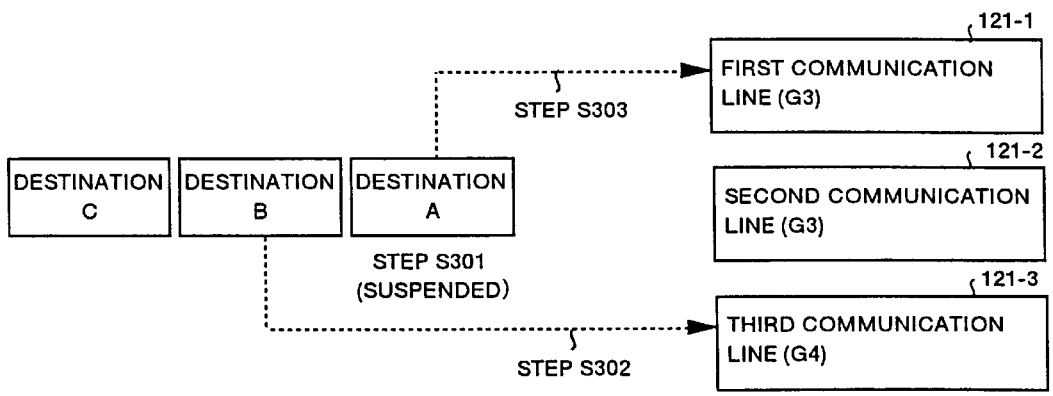

FIGS. 5A and 5B are explanatory views showing a case where types of supported lines, telephone numbers for each line type, availability of a specific modem function, and availability of a contracted procedure according to a particular protocol are ready as attribute information for each destination for transmission.

Namely, configuration of the communication lines are the same as that shown in FIGS. 4A and 4B, and for Destination A, telephone numbers of both the G3 and G4 lines are inputted with a particular modem function (V.34 based on the new recommendation by ITU-T) supported, and also a contracted procedure according to a particular protocol (particular G3 protocol) is supported, and for Destination B and Destination C, telephone numbers for the G4 line are inputted.

In the case as described above, in the present embodiment, as shown in FIG. 5B, at first allocation of a communication line to Destination A is examined in step S301, but at Destination A, also the V.34 function based on the new recommendation by ITU-T is available, so that the allocation is not executed and processed later.

Next, allocation of a communication line to Destination B is examined in step S302. For Destination B, the G4 line has been specified, so the third communication line (G4) 121-3 is allocated to Destination B.

Further in step S303, at Destination A, the function V.34 for a G3 line based on new recommendation by ITU-T is available, so that the first communication line (G3) 121-1 is allocated to execute transmission.

In the broadcasting transmission processing method based on the conventional technology, available lines are allocated according to a prespecified order, at first the third communication line (G4) 121-3 is allocated to Destination A, and transmission can not be executed to Destination B and Destination C before the transmission processing to Destination A is finished, so that transmission of any transmission file can not be executed, but in this embodiment, if the V.34 function based on the new recommendation by ITU-T is available at Destination A, the G3 line is positively used to execute transmission based on the V.34 function based on the new recommendation by ITU-T, and also if a contracted protocol procedure for the G3 line is available, the contracted protocol procedure are executed, and resources of the G4 line is allocated to Destination B and Destination C, so that general efficiency in use of a line can be improved in transmission of a transmission file in the broadcasting transmission mode with use fee of line reduced. Especially, when the multiple message transmission processing is executed in addition to this broadcasting transmission processing, the effect becomes further remarkable.

Figure 6A:
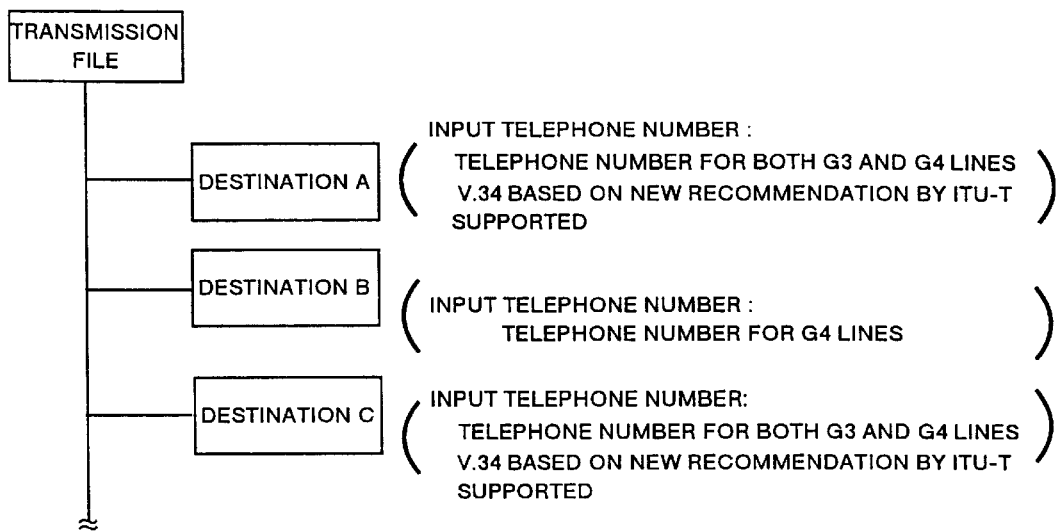
FIGS. 6A and 6B are explanatory views showing, as an example, a case where data on types of lines to be supported, telephone numbers for each line type, and availability of a specific modem function are available as attribute information for each destination.
Figure 6B:
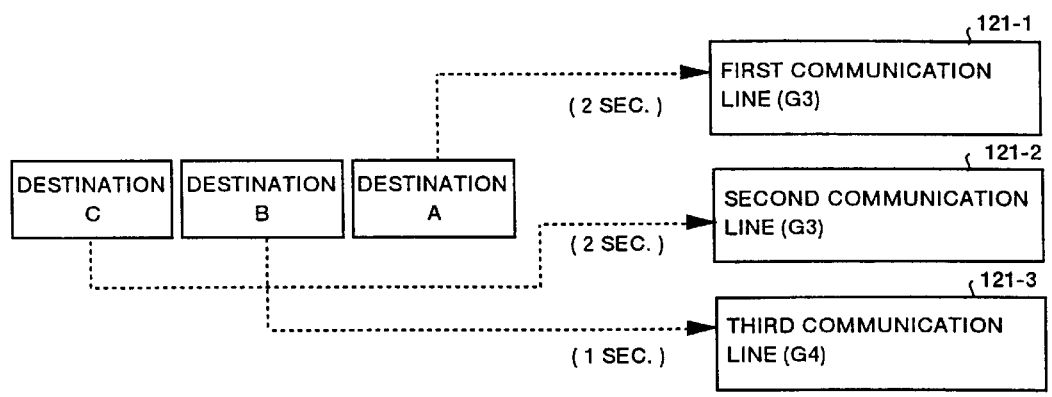

FIGS. 6A and 6B are explanatory views showing a case where types of supported lines, telephone numbers for each line type, and availability of a particular modem function are ready as attribute information for each destination.

Configuration of the communication lines is the same as that shown in FIGS. 4A and 4B, and for Destination A and Destination C, telephone numbers for both the G3 and G4 lines are inputted with a particular modem function (V.34 based on the new recommendation by ITU-T) supported, and for Destination B a telephone number for the G4 line is inputted.

In the case as described above, in the broadcasting transmission processing method based on the conventional technology, available lines are allocated according to a prespecified order, and at first, for Destination A, the third communication line 121-3, which is G4 line, is allocated to Destination A, and the G4 line can not be used for transmission to Destination B and Destination C until use of the third communication line 121-3 at Destination A is stopped.

For instance, assuming herein that a quantity of data of a transmitted document is 8 [KB] for one sheet, the terminals specified at Destination A and Destination C support the function V.34 based on the new recommendation by ITU-T, and in the V.34 function based on the new recommendation by ITU-T, the maximum data transfer rate is 33.6 [Kbps] (around 32 [Kbps], and the data rate when transmitted through the G4 line is 64 [Kbps] with the third communication line (G4) 121-3 by Destination A, Destination B, and Destination C in this order for 1 second respectively, and the entire period of time required for transmission is 3 seconds, which means that the efficiency in use of the communication lines is low.

In contrast, in this embodiment, as shown in FIG. 6B, the first communication line (G3) 121-1 is allocated to Destination A, the third communication line (G4) 121-3 is allocated to Destination B, and the second communication line (G3) 121-2 is allocated to Destination C for transmission.

For the reason as described above, assuming the same transmission file as that described above, transmission is made to Destination A through the first communication line (G3) 121-1 with the V.34 function based on the new recommendation by ITU-T, the transmission time as expressed by the following expression:

$$2[sec](=8[KB]\div\text{about }32[Kbps])$$

is required, while, for Destination C, the third communication line (G4) 121-3 is used, so that the transmission time as expressed by the following expression:

$$1[sec](=8[KB]\div 64[Kbps])$$

is required, and further for Destination C, transmission is made through the second communication line (G3) 121-2, with the V.34 function based on the new recommendation by ITU-T, the transmission time as expressed by the following expression:

$$2[sec](=8[KB]\div\text{about }32[Kbps])$$

is required, and the transmission time required for the entire processing is 2 [sec]. It should be noted that a time required for preprocessing in the protocol is omitted herein.

In FIGS. 6A and 6B, assuming a transmission file different from that described above, allocation of a communication line to a destination for transmission is examined. In this case, the first communication line (G3) 121-1 is allocated to Destination A, while the third communication line (G4) 121-3 is allocated to Destination B, and the third communication line (G4) 121-3 is allocated to Destination C, after the transmission processing to Destination B is terminated, for transmission. It is assumed therein that a document to be transmitted consists of 8 sheets and the quantity of data is 8 [KB] per sheet, 64 [KB] in all.

In the configuration of communication lines shown in FIGS. 6A and 6B, assuming that both the first communication line (G3) 121-1 and second communication line (G3) 121-2 support the V.34 function based on the new recommendation by ITU-T, the data transfer rate is at maximum 32 [Kbps], so that the data processing capability as a facsimile system is as expressed by the following equation:

$$32+32+64[Kbps]=128[Kbps](16[KB/s])$$

Figure 7A:
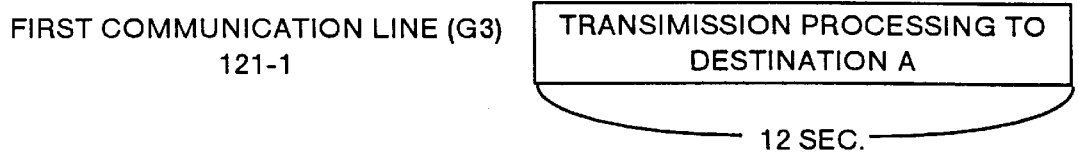
FIGS. 7A to 7C are explanatory views showing a time for transmission processing for each communication line according to the present embodiment in comparison.
Figure 7B:
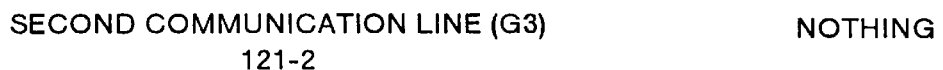
Figure 7C:
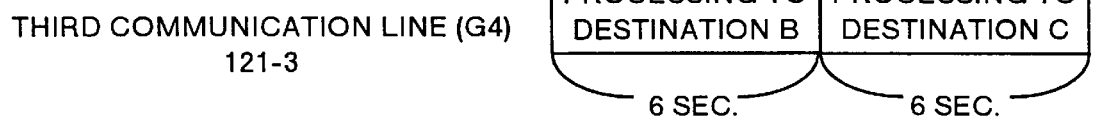

With this feature, as a quantity of data of a transmitted document 64 [KB]×the number of specified destinations of 3=192 [KB], so that the required transmission time is as expressed by the following expression:

$$192[KB/s]\div 16[KB/s]=12[sec],$$

so, the minimum transmission time in the configuration of a facsimile system as well as of a transmission file as described above is 12 [sec]. Therefore, allocation of line resources to the transmission file in this embodiment is made as shown in FIGS. 7A to 7C.

In the embodiment as described above, transmission in the broadcasting transmission is specified for one of transmission files stored in the memory 101a of the SAF managing section 101, but the same is also applicable in a case where transmission in the broadcasting mode is specified to a plurality of transmission files respectively.

Description of the above embodiment assumed a case where a facsimile system is a stand-alone type of machine, but when a network communication control section (not shown) for transmitting and receiving data to and from a client terminal device through a network is connected to the main control section 110 and transmission files are accumulated or deleted via the network communication control section from the client terminal device, the convenience and operability are further improved.

As described above, the facsimile system according to the present invention comprises a multiple message transmission object specifying unit for comparing a destination for transmission of a transmission file being transmitted by the memory transmission control unit to a destination for transmission of each of other transmission files and specifying, when there are any transmission files each having the same destination for transmission, the transmission files having the same destination for transmission as objects for multiple message transmission; a multiplex access instructing unit for issuing, when any of the transmission files as objects for multiple message transmission specified by the multiple message transmission object specifying unit has been specified as an object for multiple message transmission of other transmission files having a different destination for transmission, a multiplex access instruction to the memory transmission control unit for executing multiplex access to the transmission file as an object for multiple message transmission; and a multiplex access processing unit for executing a multiplex access to transmission files accumulated in the memory unit; wherein the memory transmission control unit determines whether or not transmission files have been specified as objects for multiple message transmission specified by the multiple message transmission object specifying unit and also a multiplex access instruction has been issued to the transmission files as objects for multiple message transmission, reads out the transmission files as objects for multiple message transmission from the memory unit in succession to the transmission files currently being transmitted and continuously transmits the read-out transmission files when the multiplex access instruction has not been issued, and reads out the transmission files as objects for multiple message transmission via the multiplex access processing unit from the memory unit and continuously transmits the read-out transmission files in succession to the transmission files currently being transmitted when the multiplex access instruction has been issued; and for this reason when the multiple message transmission processing is executed simultaneously for a plurality of communication lines, by processing one transmission file as an object for multiple message transmission for other transmission files, it becomes possible to effectively use the multiple message transmission processing function, which in turn enables effective use of communication lines, reduction of communication cost, and efficient use of a facsimile system.

The facsimile system according to the present invention further comprises a specifying unit for specifying whether a multiplex access instruction is to be issued from the multiplex access instructing unit or not, so that a user can freely specify whether the multiple message transmission processing should be executed by means of multiplex access.

The facsimile system according to the present invention further comprises a deleting unit for deleting an arbitrary transmission files among the transmission files accumulated in the memory unit; wherein the multiple message transmission object specifying unit cancels, when a transmission file deleted by the deleting unit has been specified as an object for multiple message transmission, the deleted transmission file from the object transmission files for multiple message transmission, so that a transmission file can be deleted even after the transmission file has been specified as an object for multiple message transmission, which enables improvement in convenience and operability.

The facsimile system according to the present invention further comprises a network communicating unit for transmitting and receiving data to and from a client terminal device through a network; wherein a transmission file can be accumulated in or deleted from the client terminal device via the network communicating unit, so that further improvement in convenience and operability is possible.

The facsimile system according to the present invention further comprises a telephone number registering unit for registering and storing telephone numbers and attribute information corresponding to each destination for transmission; wherein the memory transmission control unit refers, when a transmission file is to be transmitted, to a telephone number and attribute information corresponding to a destination for transmission of the transmission file to be transmitted and stored in the telephone number registering unit and selects an optimal communication control units from the plurality of communication control units, so that it is possible to improve efficiency in use of a communication line and also to reduce the line use fee.

In the facsimile system according to the present invention, the memory transmission control unit refers to the attribute information and selects, when a destination for transmission of the transmission file can be connected only with a G3 line or a G4 line, a communication control unit for an appropriate line from the plurality of communication control units, and successively selects, when the destination for transmission can be connected with either a G3 line or a G4 line, available communication units from the plurality of communication control units, so that it is possible to improve efficiency in use of a communication line and also to reduce the line use fee.

This application is based on Japanese patent applications No. HEI 8-342234 and HEI 9-339125 filed in the Japanese Patent Office on Dec. 20, 1996 and Dec. 9, 1997, respectively, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A facsimile system comprising:

a plurality of communication controllers each connected to a communication line having at least one communication channel;

a memory unit for accumulating therein a plurality of transmission files;

a memory transmission controller for automatically transmitting said transmission files to corresponding destinations for transmission by controlling said plurality of communication controllers according to each destination of said transmission files;

a multiple message transmission object specifying unit for comparing a destination for transmission of a transmission file being transmitted by said memory transmission controller to a destination for transmission of each of other transmission files accumulated in the memory unit and specifying, when there are any transmission files each having the same destination for transmission, said transmission files having the same destination for transmission as objects for multiple message transmission;

a multiplex access instructing unit for issuing, when any of the transmission files as objects for multiple message transmission specified by said multiple message transmission object specifying unit has been already specified as an object for multiple message transmission of other transmission files having a different destination for transmission, a multiplex access instruction to said memory transmission controller for executing multiplex access to the transmission file as an object for multiple message transmission; and a multiplex access processing unit for executing a multiplex access to transmission files accumulated in said memory unit; wherein said memory transmission controller determines whether or not transmission files have been specified as objects for multiple message transmission specified by said multiple message transmission object specifying unit and also a multiplex access instruction has been issued to the transmission files as objects for multiple message transmission, reads out the transmission files as objects for multiple message transmission from the memory unit in succession to the transmission files currently being transmitted and continuously transmits the read-out transmission files when the multiplex access instruction has not been issued, and reads out said transmission files as objects for multiple message transmission via said multiplex access processing unit from said memory unit and continuously transmits the read-out transmission files in succession to said transmission files currently being transmitted when said multiplex access instruction has been issued.

2. A facsimile system according to claim 1 further comprising:

a specifying unit for specifying whether a multiplex access instruction is to be issued from said multiplex access instructing unit or not.

3. A facsimile system according to claim 1 further comprising:

a deleting unit for deleting an arbitrary transmission files among the transmission files accumulated in said memory unit; wherein said multiple message transmission object specifying unit cancels, when a transmission file deleted by said deleting unit has been specified as an object for multiple message transmission, said deleted transmission file from the object transmission files for multiple message transmission.

4. A facsimile system according to claim 1 further comprising:

a network communicating unit for transmitting and receiving data to and from a client terminal device through a network; wherein a transmission file can be accumulated in or deleted from said client terminal device via said network communicating unit.

5. A facsimile system according to claim 1 further comprising:

a telephone number registering unit for registering and storing telephone numbers and attribute information corresponding to each destination for transmission; wherein said memory transmission controller refers, when a transmission file is to be transmitted, to a telephone number and attribute information corresponding to a destination for transmission of the transmission file to be transmitted and stored in said telephone number registering unit and selects an optimal communication controllers from said plurality of communication controllers.

6. A facsimile system according to claim 5; wherein said memory transmission controller refers to the attribute information and selects, when a destination for transmission of the transmission file can be connected only with a G3 line or a G4 line, a communication controller for an appropriate line from said plurality of communication controllers, and successively selects, when the destination for transmission can be connected with either a G3 line or a G4 line, available communication units from said plurality of communication controllers.

7. A facsimile system comprising:

a plurality of communication controllers each connected to a communication line having at least one communication channel;

a memory unit for accumulating therein a plurality of transmission files;

a memory transmission controller for automatically transmitting said transmission files to corresponding destinations for transmission by controlling said plurality of communication controllers according to each destination of said transmission files;

a multiple message transmission object specifying unit for comparing a destination for transmission of a transmission file being transmitted by said memory transmission controller to a destination for transmission of each of other transmission files accumulated in the memory unit and specifying, when there are any transmission files each having the same destination for transmission, said transmission files having the same destination for transmission as objects for multiple message transmission;

a multiplex access instructing unit for issuing, when any of the transmission files as objects for multiple message transmission specified by said multiple message transmission object specifying unit has been already specified as an object for multiple message transmission of other transmission files having a different destination for transmission, a multiplex access instruction to said memory transmission controller for executing multiplex access to the transmission file as an object for multiple message transmission;

a specifying unit for specifying whether a multiplex access instruction is to be issued from said multiplex access instructing unit or not;

a deleting unit for deleting an arbitrary transmission file among the transmission files accumulated in said memory unit; wherein said multiple message transmission object specifying unit cancels, when a transmission file deleted by said deleting unit has been specified as an object for multiple message transmission, said deleted transmission file from the object transmission files for multiple message transmission;

a network communicating unit for transmitting and receiving data to and from a client terminal device through a network; wherein a transmission file can be accumulated in or deleted from said client terminal device via said network communicating unit;

a telephone number registering unit for registering and storing telephone numbers and attribute information corresponding to each destination for transmission; wherein said memory transmission controller refers, when a transmission file is to be transmitted, to a telephone number and attribute information corresponding to a destination for transmission of the transmission file to be transmitted and stored in said telephone number registering unit and selects an optimal communication controller from said plurality of communication controllers; and a multiplex access processing unit for executing a multiplex access to transmission files accumulated in said memory unit; wherein said memory transmission controller determines whether or not transmission files have been specified as objects for multiple message transmission specified by said multiple message transmission object specifying unit and also a multiplex access instruction has been issued to the transmission files as objects for multiple message transmission, reads out the transmission files as objects for multiple message transmission from the memory unit in succession to the transmission files currently being transmitted and continuously transmits the read-out transmission files when the multiplex access instruction has not been issued, and reads out said transmission files as objects for multiple message transmission via said multiplex access processing unit from said memory unit and continuously transmits the read-out transmission files in succession to said transmission files currently being transmitted when said multiplex access instruction has been issued.

8. A facsimile system according to claim 7; wherein said memory transmission controller refers to the attribute information and selects, when a destination for transmission of the transmission file can be connected only with a G3 line or a G4 line, a communication controller for an appropriate line from said plurality of communication controllers, and successively selects, when the destination for transmission can be connected with either a G3 line or a G4 line, available communication units from said plurality of communication controllers.

* * * * *